Figures 1, 2:
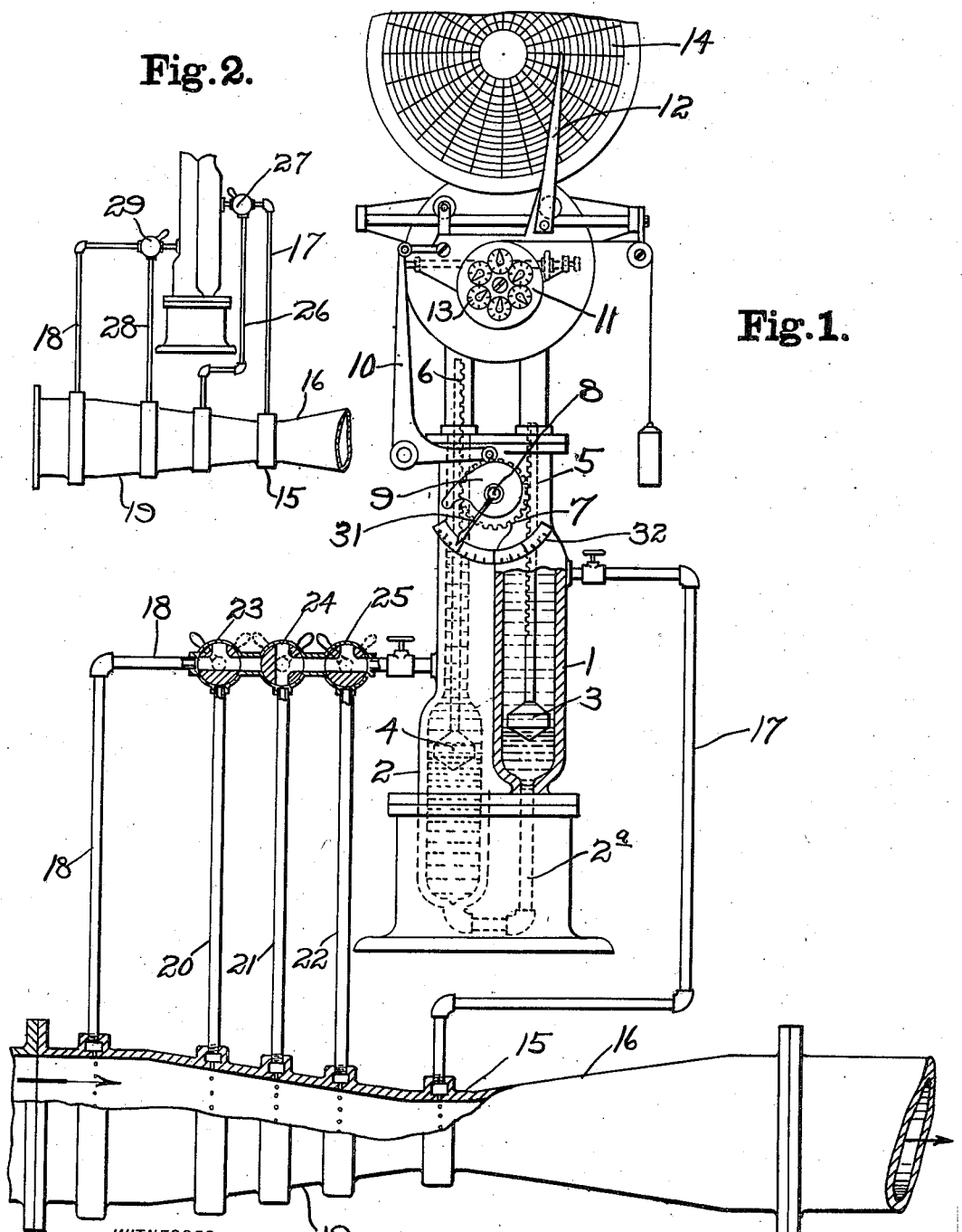

F. N. CONNET.
METER.
APPLICATION FILED JUNE 14, 1909.

944,417.

Patented Dec. 28, 1909.

WITNESSES
Willard W. Bardsley.
E. D. Ogden

INVENTOR
Frederick N. Connet.

BY Howard E. Barlow
ATTORNEY

UNITED STATES PATENT OFFICE.

FREDERICK N. CONNET, OF PROVIDENCE, RHODE ISLAND.

METER.

944,417.  Specification of Letters Patent.  Patented Dec. 28, 1909.

Application filed June 14, 1909. Serial No. 501,895.

*To all whom it may concern:*

Be it known that I, FREDERICK N. CONNET, a citizen of the United States, residing at the city of Providence, in the county of Providence and State of Rhode Island, have invented certain new and useful Improvements in Meters, of which the following is a specification, reference being had therein to the accompanying drawings.

This invention relates to improvements in the construction of meter tubes of the class commonly known as the "Venturi tube," and the object of the invention is to provide means on said tube whereby one or more connections may be made thereto at any point in the tapering portion of said tube intermediate the usual upstream connection above the tapering portion and the throat.

A further object of the invention is to connect these extreme, and also one or more of the intermediate points in the tube, with an indicating, integrating or recording instrument, so that if the rate of flow becomes too great for the accurate reading of the instrument when connected with the extreme points, then either one or the other of the extremes may be operated with one of the intermediates, or where the rate is very excessive both of the extreme connections may be cut out and only intermediate connections used, whereby the difference between the operating pressures is reduced within the range of the recording power of the instrument. The preferred arrangement, however, where a great range of rates is desired to be indicated, is to provide a plurality of connections at close intervals along the tapering portion of the tube on the upstream side of the throat, and then as the rate increases beyond the recording capacity of the instrument to shift the upstream connection, step by step, toward the throat which latter connection is permanently retained, thus reducing the distance and consequently the difference in the pressures between the operating points, so that said difference will fall within the operating range of the recording instrument. As the operating connection is shifted from one point to the other along the tube it will of course be necessary to multiply the readings by a known constant or coefficient or to change the graduations, cams, or other mechanism which control the operation of the indicating, integrating or recording mechanism.

With these and other objects in view, the invention consists of certain novel features of construction, as will be more fully described and particularly pointed out in the appended claims.

In the accompanying drawings: Figure 1 is a diagrammatic view illustrating the usual throat connection, also a plurality of connections from the upstream tapered portion of the tube to a registering and recording instrument. Fig. 2— illustrates a throat and intermediate connection leading to one float chamber, also an upstream and an intermediate connection leading to the opposite float chamber, whereby the extreme connections only, or the intermediate connections only, may be used, or if desired, either of the intermediate connections may be used with the extreme connection to the opposite float chamber.

In practice any desired or suitable device or instrument may be employed for indicating, integrating or recording the rate of flow through the meter tube, but for convenience I have illustrated the type of integrating and recording manometer shown and described in my Patent No. 920,025 of April 27, 1909, which comprises a pair of cylinders 1 and 2, communicating with each other at their lower ends through pipe $2^a$, the same being supplied with mercury, on the surface of which rest the floats 3 and 4, said floats being connected through racks 5 and 6, gears 7 with the cam shaft 8 to rotate the cam 9 and operate, through the arm 10, the integrating device 11 and recorder 12, whereby the rate of flow may be accurately registered on the dials 13 and recorded on the record sheet 14. To the apparatus above described I have also attached to the shaft 9 a hand 31 which moves over the graduated scale 32 for the purpose of indicating the rate of flow through the meter tube. The preferred arrangement of connections between this instrument and the tube is that illustrated in Fig. 1, in which the cylinder 1 communicates with the throat portion 15 of the tube 16 through the pipe 17, while the cylinder 2 is connected through pipe 18 to the upstream side of the tube just beyond the tapered portion 19, whereby the difference in the water pressures between these points is caused to change the relative levels of said floats. When the meter is used for very high velocities or where a great range of velocity is desired to be recorded a plurality of intermediate connections 20, 21 and 22 may be used and are shown as being connected a short distance apart from pipe 18 to the tapered portion of said tube, each of said pins being supplied with a three-way cock 23, 24 and 25 at its junction to said pipe, whereby either the first, or any of the intermediate connections may be made from said tube to the cylinder 2 in order to regulate the working distance between the active upstream and throat connections, and therefore the difference between the pressures at these points, so that said differences will fall within the operating range of the recording instrument. These three-way cocks are so arranged that only the pressure from the one connection desired is operated at a time on the cylinder 2.

In operation when the flow through the pipe is normal the upstream connection 18 and the throat connection 17 are alone used, but when the flow increases to such an extent that the mercury is driven completely out of one cylinder into the other the instrument fails to accurately record the flow, therefore the cock 23 may be turned so as to open communication with the pipe 20 and close that with the pipe 18 thus reducing the distance and consequently the difference in the pressures between the pipes 20 and 17, but if this is still insufficient, valve 24 is placed in the position indicated in Fig. 1, opening pipe 21 and closing pipes 18 and 20, again reducing the distance and therefore the difference between the pressures at the points now connected. If the difference is still too great to be accurately recorded on the instrument, cock 25 may be operated to open communication through pipe 22 and cut out the other connections, and so on. Any number of pipes may be connected to the tube which may be desired, whereby the necessary reduction may be obtained, the throat connection being preferably retained as that portion of the tube is usually accurately finished to a given diameter. As each change is made, when an instrument of the class described is employed, a change must be made in the graduations or readings or in the shape or size of the operating cam 9.

A modification is shown in Fig. 2, in which an intermediate pipe 26 is shown as being connected through the three-way cock 27 with the throat pipe 17, and also an intermediate connection 28 is shown as being connected to the upstream pipe 18 through the three-way cock 29, each of these set of pipes leading to their respective cylinders in the rate indicating instrument. By this arrangement under normal conditions connections 17 and 18 will be used and as the flow increases beyond the recording power of the instrument as actuated through these connections, either one of the extremes may be operated in conjunction with one of the intermediates, or both of the extremes may be cut out and the intermediates used exclusively, by which arrangement the difference in the pressures between the two operating points may be reduced to such an extent as to fall within the operating range of the recording, integrating and indicating instrument.

In order to obtain the best results the tube should be supplied with annular chambers, shown in the drawings, which chambers are formed at the desired intervals along the tube and communicate with the interior thereof, from which chambers the pressure conducting pipes lead to the rate actuated instrument.

In the drawing this instrument is illustrated as having a pair of cylinders supplied with mercury and floats, the same being controlled in their action by the rate of flow through the meter tube to show the quantity which has passed, or the rate at which the same is passing through said tube at the time of observation, the same comprising an indicating, an integrating, and a recording device.

Having thus described my invention, what I claim as new and desire to secure by Letters Patent, is:

1. A meter comprising a tapering tube having a reduced portion or throat, a rate actuated instrument for showing the amount of water which passes through said tube, a pipe connecting said instrument with said throat, a plurality of pipes connecting said instrument with said tube along the tapering portion of the latter, and means for admitting the pressures from any of several combinations of pipes whereby the instrument is caused to operate and produce the desired result.

2. A meter comprising a tapering tube having a reduced portion or throat, a rate actuated instrument for showing the amount of water which passes through said tube, a pipe connecting said instrument with said throat, a pipe connecting said instrument with the enlarged upstream portion of said tube, one or more pipes connecting said instrument with said tube along the tapering portion of the latter, and valves for admitting the pressures from any of several combinations of said pipes to produce the desired effect upon said instrument.

3. In a meter, the combination with a tapering tube having a reduced portion or throat, of a rate actuated instrument for showing the amount of water which passes through said tube, a pipe connecting said instrument with the enlarged or upstream portion of said tube, one or more pipes connecting said instrument with one or more intermediate points along the tapered portion of said tube, and valves for admitting the pressures from any of several combinations of said pipes whereby the desired effect upon said instrument may be obtained.

4. A meter comprising a tapering tube having a reduced portion or throat, a rate actuated instrument for showing the amount of water which passes through said tube, a pipe connecting said instrument with said throat, one or more pipes connecting said instrument with said tube along the tapering portion of the latter, and means for admitting the pressures from the different pipes to said instrument whereby the latter may be actuated by a great range of pressures to accurately show the rate through said tube.

5. A meter comprising a tapering tube having a reduced portion or throat, an annular chamber about and communicating with said throat portion, an annular chamber about and communicating with the enlarged upstream portion of said tube, one or more intermediate annular chambers about and communicating with the tapered portion of said tube, a rate actuated instrument for showing the amount of water which passes through said tube, a pipe connecting each of said chambers to said instrument, and valves in said pipes whereby the pressure from any of several combinations of said pipes may be used to produce the desired effect upon said instrument.

6. A meter comprising a tapering tube having a reduced portion or throat, a plurality of annular chambers about and communicating with the tapered portion of said tube, a rate actuated instrument for showing the amount of water which passes through said tube, a pipe connecting each of said chambers to said instrument, and valves in said pipes whereby the pressure from any of several combinations of said pipes may be used to produce the desired effect upon said instrument.

In testimony whereof I affix my signature in presence of two witnesses.

FREDERICK N. CONNET.

Witnesses:
 WM. R. TILLINGHAST,
 HOWARD E. BARLOW.